United States Patent Office 2,815,043
Patented Dec. 3, 1957

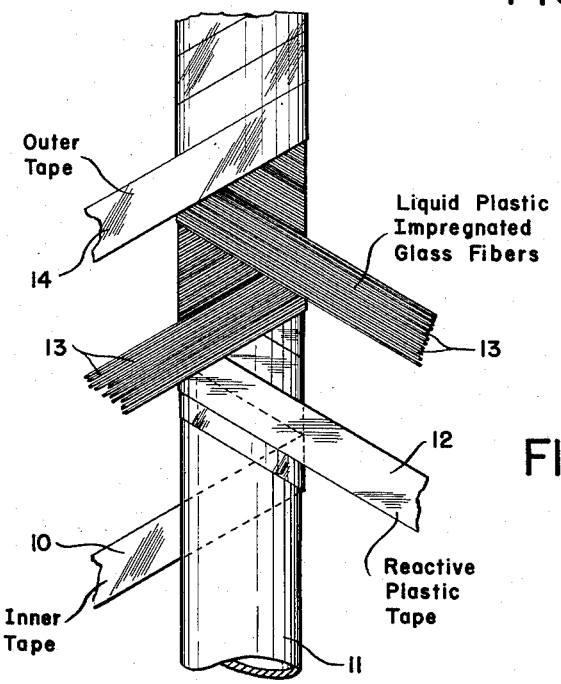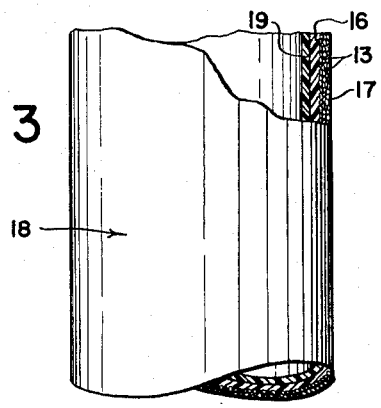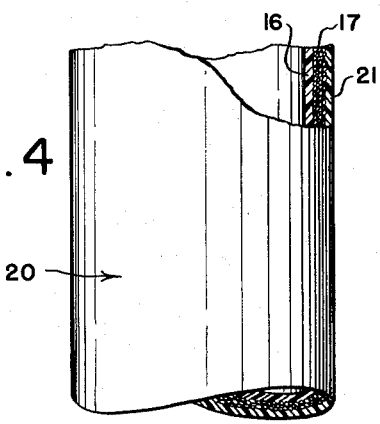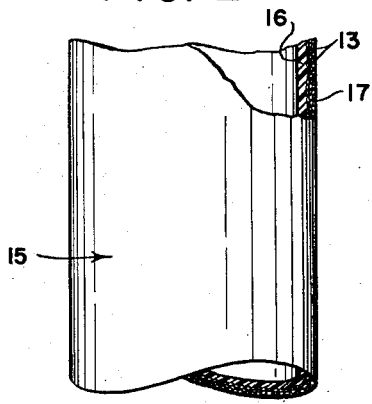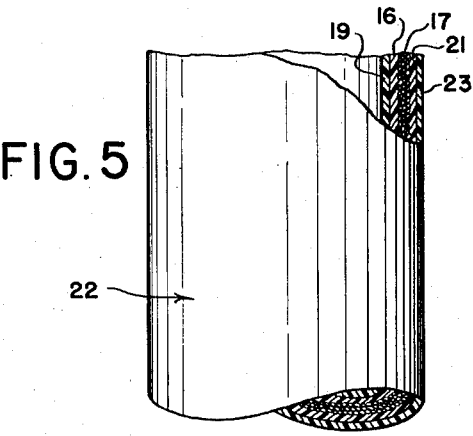

2,815,043

PLASTIC PIPE AND METHOD OF MAKING SAME

Walter B. Kleiner, Dunellen, and George N. Carmichael, South Amboy, N. J., and Carl de Ganahl, Greenlawn, N. Y.; said Kleiner and said Carmichael assignors to said de Ganahl Application March 29, 1955, Serial No. 497,585

24 Claims. (Cl. 138—76)

This invention relates to the manufacture of an improved plastic pipe, and to a novel plastic composition employed in the manufacture of such pipe. This application is a continuation-in-part of application Serial No. 493,372 field March 10, 1955.

Plastic pipe comprising an integrally formed plastic pipe body through which extends continuous strands of glass fiber reinforcing material has heretofore been manufactured by coating and impregnating the glass fiber material with a thermosetting plastic composition, wrapping the coated fibers about a pipe-forming mandrel, and heating the materials on the mandrel to cure the plastic composition. After curing the plastic, the resulting glass fiber reinforced plastic pipe is then removed from the mandrel. The glass fiber reinforcing material in the pipe structure advantageously comprises a plurality of helically applied multi-filament glass fiber rovings, and the thermosetting plastic composition employed to coat and impregnate the glass fibers and to form the coherent plastic wall of the finished pipe is advantageously compounded from such plastic materials as the so-called epoxide and polyester resins. In the manufacture of such plastic pipe, however, difficulty is encountered when it is desired to remove the finished pipe from the pipe-forming mandrel after the plastic has been treated to cure or set the resin. Moreover, the finished plastic pipe quite often is not impervious to the fluid materials the pipe is designed to convey.

To overcome the tendency of the plastic compositions to stick to the pipe-forming mandrel, and hence to be difficult to strip therefrom, it has heretofore been proposed to wrap the pipe-forming mandrel with a parting layer of a tape non-adherent to the mandrel and inert to the plastic composition. To that end, the process of making plastic pipe has included the additional step of wrapping the pipe-forming mandrel with a layer of cellophane tape or a similar non-adherent and inert material prior to applying the plastic-coated glass fibers thereto. With the use of such a non-adherent parting tape, it is possible to remove the finished pipe from the pipe-forming mandrel without difficulty. However, removal of the parting tape from within the finished plastic pipe has proved to be a vexing problem. Although the plastic composition is chemically inert with respect to the cellophane or other parting tape, the parting tape tends to cling to the plastic pipe wall with just sufficient tenacity to make its removal from the pipe by simply pulling it therefrom practically impossible. Therefore, it has been necessary to resort to expensive and time-consuming scraping, scouring or similar operations to completely remove the parting tape from the plastic pipe.

A further serious disadvantage sometimes encountered in the prior art plastic pipe is that after repeated pressure surges the pipe wall may become pervious to the fluid carried by the pipe. Depending upon its extent, the resulting leakage of fluid through the pipe wall may be a mere annoyance or may be so serious as to amount to failure of the pipe.

We have devised a method for manufacturing plastic pipe that utilizes a novel plastic composition in the pipe structure and results in the production of a pipe not subject to the foregoing disadvantages. Plastic pipe manufactured pursuant to our method can be easily stripped from the pipe-forming mandrel after the plastic composition is treated to set the plastic, and the resulting finished pipe has a smooth inner surface completely impervious to the fluids which the plastic pipe is designed to carry.

The method of making plastic pipe pursuant to our invention comprises applying about a pipe-forming mandrel at least one layer of reactive plastic tape, the plastic tape comprising from about 45% to 75% by weight of thermoplastic vinyl polymers plasticized with from about 10% to 50% by weight of polymerizable thermosetting resins or equivalent reactive materials compatible with the vinyl polymer, applying about the layer of plastic tape at least one layer of glass fiber rovings or equivalent reinforcing material coated and impregnated with an uncured thermosetting resin composition, the uncured resin composition being reactive with the thermosetting resin or equivalent material of the plastic tape to form a chemical bond therewith when the resin is cured, and heating the plastic materials on the mandrel to cure the thermosetting resins. Advantageously a parting layer of a non-adherent and inert tape is applied about the mandrel before applying the tape of vinyl polymer and thermosetting resin. When such a parting tape is used, it can easily be pulled from within the pipe after the pipe is drawn from the mandrel, for the parting tape has no tendency whatever to stick to the vinyl polymer tape now forming the inner surface of the plastic pipe.

The finished plastic pipe has an integrally formed monolithic plastic structure characterized by a smooth inner surface impervious to the fluids carried by the pipe. Successive turns of the polyvinyl tape are fusion-bonded together, so that the pipe comprises an impervious plastic inner lining chemically bonded to a glass fiber (or equivalent reinforcing material) reinforced plastic pipe body. The plastic inner lining of the pipe comprises a blend of thermoplastic vinyl polymers and cured thermosetting materials in the proportions noted herein. The glass fiber reinforced plastic pipe body comprises continuous strands of glass fiber rovings extending through a coherent body of cured thermosetting resin copolymerized with the thermosetting material of the inner lining. The thermosetting resin of the plastic pipe body preferably is either an epoxide or alkyd polyester resin. For specialized applications the inner lining of the pipe may include one or more additional layers of vinyl polymers fusion-bonded to the inner surface of the vinyl-and-thermo-setting resin composition. Similarly, an outer sheath of the vinyl-and-thermosetting resin composition can be applied about and chemically bonded to the thermosetting resin of the plastic pipe body.

The unique structure of the plastic pipe manufactured pursuant to our invention is due to the incorporation therein of a novel plastic composition in the form of the plastic tape about which the plastic impregnated glass fiber rovings are applied. The plastic composition comprises a homogeneous mixture of from about 45 to 75% by weight of a thermoplastic vinyl polymer and from about 10 to 50% by weight of polymerizable thermosetting resins or similar reactive materials compatible with the vinyl polymers. The uncured thermosetting material acts as a plasticizer for the vinyl polymers and may be used as such without the addition of other plasticizing substances (in which case, of course, the minimum permissible amount of the reactive plasticizer constitutes about 25% by weight of the composition). When the composition contains less than 25% by weight of the reactive plasticizer, an effective amount, comprising up to 45% by weight of the composition, of other plasticizers for the vinyl polymers are incorporated in the composition. In addition, the composition may contain an effective amount, comprising up to 10% by weight, of a polymerization catalyst for the thermosetting resin or equivalent reactive material.

The vinyl compounds useful in our composition include polymers and copolymers of vinyl chloride, vinyl acetate, vinylidene chloride and vinyl butyral. The preferred thermosetting resins are the so-called epoxide and alkyd polyester resins. Useful plasticizers, other than the uncured thermosetting resins employed, include dioctyl phthalate, diallyl phthalate, fatty acid esters, chlorinated paraffins, unsaturated fatty acids, and tricresyl phosphate. Any of the conventional polymerization catalysts compatible with the other ingredients of the composition, and preferably those that become effective at temperatures in excess of 100° F., may be used.

The method of making plastic pipe pursuant to our invention, and the improved pipe produced thereby, will be better understood from the following description taken in conjunction with the accompanying drawings of which:

Fig. 1 shows the manner in which the various components of our improved pipe are laid on the pipe-forming mandrel in the course of the manufacture of the pipe, Fig. 2 is a fragmentary view of the improved plastic pipe produced pursuant to our invention, Fig. 3 is a fragmentary view of a slightly modified form of the pipe of our invention.

Fig. 4 is a fragmentary view of plastic pipe incorporating an impervious outer sheath pursuant to our invention, and Fig. 5 is a fragmentary view of a slightly modified form of the pipe shown in Fig. 4.

As shown in Fig. 1, the method of manufacturing plastic pipe pursuant to our invention advantageously comprises applying a parting layer of non-adherent tape 10 about a pipe-forming mandrel 11. Then there is applied at least one layer of plastic tape 12, and about the plastic tape are wrapped one or more layers of glass fiber rovings 13 or equivalent reinforcing material coated and impregnated with an uncured thermosetting liquid resin composition. An outer tape 14 is advantageously applied about the outermost layer of plastic impregnated fibers to help retain the uncured resin in place on the mandrel. As will be readily appreciated, other layers of the same or similar plastic materials can be applied about the mandrel under or over the above-mentioned plastic layers, as hereinafter more fully explained.

The various layers of material can be applied to the mandrel by any suitable technique. We presently prefer to advance the pipe-forming mandrel 11 upwardly through the central openings of a number of annular tables from which are dispensed in succession the non-adherent tape 10 and the plastic tape 12, the several layers of plastic impregnated glass fiber rovings 13, and the outer tape 14. Advantageously, each successive layer is applied helically to the mandrel with a pitch opposite in direction to that of the underlying layer, the tapes being applied to the mandrel with the edge of each wrapping of a tape slightly overlapping the preceding wrapping of the tape. (Preferably at least one layer of glass fiber rovings or strands of equivalent material extends longitudinally of the pipe, being laid on parallel to the axis of the mandrel, but since this element of the pipe structure is not a part of this invention, it is not illustrated in the drawings.)

After the various components of the pipe are applied to the mandrel 11, the plastic materials are heated to cure the liquid resin composition while it is on the mandrel. After the resin has been completely cured, the resulting pipe is removed from the mandrel simply by sliding it therefrom. The layer of non-adherent parting tape 10 is then removed from within the pipe by simply pulling it therefrom as one would pull twine from inside a ball of twine.

As shown in Fig. 2 of the drawing, the plastic pipe 15 produced by the method of our invention has an integrally formed structure comprising a smooth impervious plastic inner lining 16 chemically bonded to a glass fiber reinforced plastic pipe body 17. The impervious inner lining 16 of the pipe 15 comprises the cured plastic composition from which the tape 12 was formed, adjoining turns of the tape 12 fusing and bonding together, and to any underlying or overlying tapes of similar composition, when the plastic materials are heated to their curing temperature. In like manner, the plastic pipe body 17 comprises the cured coherent body of thermosetting resin composition with which the glass fibers 13 were coated, the uncured liquid resin coating on each fiber 13 running together with the coatings on adjoining fibers, and on underlying and overlying fibers, to form the aforesaid coherent body of resin. The integral or monolithic structure of the pipe 15 is due to the chemical bond, as by copolymerization, that exists between the composition of the inner lining 16 and that of the pipe body 17. The plastic pipe of our invention possesses the superior strength inherent in glass fiber reinforced plastic bodies, and has outstanding resistance to the development of the minute cracks formed in the pipe wall of prior art pipe when such pipe is subjected to internal pressure surges.

In an advantageous modification of our invention, plastic pipe is produced such as that shown in Fig. 3 of the drawing. In this modification the impervious inner lining of the pipe 18 comprises an innermost layer 19 of vinyl polymers fusion-bonded to the vinyl constituent of the intermediate plastic layer 16. The vinyl layer 19 is incorporated in the pipe structure by applying a layer of vinyl tape about the pipe-forming mandrel 11 prior to applying the plastic tape 12 thereabout. The vinyl tape is formed from one or more vinyl polymers plasticized with a suitable non-reactive substance, in the manner well known in the art. (We have, for example, successfully used "Koroseal" vinyl film for this purpose.) When this procedure is followed, the innermost vinyl tape becomes fusion-bonded to the plastic tape 12 when the plastic materials on the mandrel are heated. Alternatively, the inner lining 19 may be incorporated in the pipe 18 by placing an extruded tube of vinyl plastic about the mandrel 11 prior to applying the plastic tape 12 thereabout. Moreover, if desired, more than one layer of vinyl tape can be applied to the mandrel, the several tapes fusing together to become the innermost layer 19 of the plastic inner lining of the pipe 18 when the plastic materials are heated as described. Plastic pipe 18 having an innermost layer 19 of resilient vinyl plastic has outstanding resistance to fatigue failure and to chemical attack by most corrosive and chemically active substances.

In the modification of our invention shown in Fig. 4, the integrally formed plastic pipe structure 20 comprises the fiber reinforced plastic pipe body 17 to which is chemically bonded the impervious plastic inner lining 16 and an impervious plastic outer sheath 21. The plastic outer sheath 21 is incorporated in the pipe structure by applying about the layers of liquid plastic coated fibers 13 at least one layer of a plastic tape of the same type as the tape 12. When the plastic materials on the mandrel 11 are cured, the turns of the inner layer of tape 12 fuse together to form the inner lining 16, the plastic composition on the fibers 13 sets up to form the fiber reinforced plastic pipe body 17, and the turns of the outer layer of plastic tape fuse together to form the outer sheath 21 of the pipe 20, the inner lining 16 and the outer sheath 21 simultaneously becoming chemically bonded, as by copolymerization, to the plastic pipe body 17.

The plastic pipe structure 22 shown in Fig. 5 is a further modification of our invention in which an impervious plastic inner lining and an impervious plastic outer sheath are chemically bonded to a fiber reinforced plastic pipe body. In this modification both the plastic inner lining and plastic outer sheath are substantially the same in structure as the inner lining of the pipe 18 shown in Fig. 3.

That is, both inner lining and outer sheath comprise surface layers 19 and 23, respectively, of resilient vinyl plastic fusion-bonded to intermediate layers 16 and 21, respectively, of the plastic composition of the tape 12. The intermediate layers 16 and 21, of course, are chemically bonded to the fiber reinforced plastic pipe body 17. Plastic pipe having the structure described is formed by first applying successively about the mandrel 11 one or more layers of vinyl tape, one or more layers of reactive plastic tape 12, several layers of liquid plastic impregnated fibers 13, one or more layers of tape 12, and one or more outer layers of vinyl tape, and then heating the plastic materials on the mandrel to cure them in the manner described.

The plastic tape 12 applied about the non-adherent parting tape 10, and advantageously about the plastic coated fibers 13, is essentially a homogeneous mixture of thermoplastic vinyl polymers and polymerizable thermosetting resins or equivalent reactive materials. The thermoplastic vinyl polymer constituent of the tape 12 contributes strength and body to the tape prior to curing of the thermosetting material and permits it to be applied over the layer of parting tape 10 without difficulty. The thermosetting resin or equivalent reactive constituent of the plastic tape 12 acts as a plasticizer for the vinyl polymer prior to curing of the thermosetting resins in the plastic pipe, and after curing forms with the vinyl polymer a hard and impervious surface on the inside of the pipe. The thermosetting material must, of course, be compatible with the vinyl compound in the tape. That is, the two substances must be capable of being intimately blended together, without adverse physical or chemical effects or any tendency to segregate, to form a smooth plastic mass that can be rolled out into a thin film or tape. In addition, the thermosetting material must be capable of becoming chemically bonded to the thermosetting resin composition impregnating the subsequently applied glass fiber rovings 13, as by copolymerization therewith, when the plastic materials on the mandrel are heated and cured. The plastic composition advantageously also includes plasticizers for the vinyl polymers (in addition to the thermosetting material) and a catalyst to promote subsequent polymerization of the thermosetting reactive material.

The vinyl polymer constituent of the plastic composition from which the tape 12 is fabricated comprises from about 45% to 75%, and preferably from 55% to 70%, by weight of the composition. We have found that plastic tapes containing significantly greater amounts of vinyl polymers tend to be hard and stiff and, consequently, difficult to handle. Tapes containing significantly lesser amounts of vinyl polymers tend to be too soft and tacky and to exude its plasticizing constituent. The vinyl compounds we have found useful in our composition include polymers and copolymers of vinyl chloride, vinyl acetate, vinylidene chloride and vinyl butyral. Of these, we presently prefer to use a copolymer comprising about 96% vinyl chloride and 4% vinyl acetate.

The thermosetting resins or equivalent reactive constituents of the plastic composition comprise from about 10% to 50% by weight of the composition. As hereinbefore noted, the uncured thermosetting material acts as a plasticizer for the vinyl polymers and may be used as such to the exclusion of other plasticizing substances. In such cases, of course, the amount of uncured resin or other reactive plasticizing material in the composition would range from about 25% to 50% by weight of the composition, depending upon the amount of vinyl polymers present therein. When the composition contains less than 25% by weight of the thermosetting material, an additional plasticizing substance must be incorporated therein to give the plastic tape the desired physical and handling characteristics. As noted, the thermosetting material employed must be compatible with vinyl polymers, and must be capable of becoming chemically bonded to the thermosetting resin composition on the glass fibers subsequently wrapped thereabout. Accordingly, it is desirable, although not always essential, to use the same or closely related thermosetting resins in both the plastic tape composition and the uncured resin composition on the glass fiber rovings.

We presently prefer to use for this purpose the so-called epoxide resins. Epoxide compounds are those compounds having an ether oxygen atom joined to two vicinal carbon atoms. The term "epoxide resin" as used in the present specification and in the appended claims denotes the resinous reaction product of certain of these epoxide compounds and compounds having available hydrogen atoms linked to carbon atoms by oxygen atoms as, for example, polyhydric phenols and polyhydric alcohols. A particularly useful epoxide resin is the reaction product of an epihalohydrin and a polyhydric phenol, as exemplified by bisphenol-epichlorhydrin. Other epoxide resins suitable for use in the manufacture of our plastic pipe include the reaction products of epihalohydrins and a polyhydric alcohol such as ethylene glycol, propylene glycol, trimethylene glycol, and the like. Other equivalent epoxide resins are well known to those skilled in the plastics art.

The epoxide resins employed are advantageously partially polymerized prior to their incorporation in the plastic composition in order to stabilize or fix the resin and to increase its molecular weight and viscosity. The molecular weight of such partially polymerized resins is usually of the order of 500 to 1000. Moreover, the resins advantageously have intimately mixed therewith an effective amount of one of the known polymerization catalysts for such resins. We have found it particularly advantageous to use as a catalyst a substance whose catalyzing action becomes effective only after it has been heated to a temperature in excess of 100° F. The use of such a temperature-triggered catalyst permits the catalyzed plastic tape composition to be compounded, stored, and applied to the mandrel without any tendency of the thermosetting material therein to polymerize prematurely due to the presence of the catalyst. Substances that will become polymerization catalysts for epoxide resins when heated to temperatures in excess of 100° include certain complex borontrifluoride amines such as borontrifluoride monoethylamine, borontrifluoride triethanolamine, and borontrifluoride piperidine. The amount of any catalyst present in the composition will depend upon the effectiveness of the catalyst selected, and upon such practical considerations as the length of time that can economically be allotted to the cure of the thermosetting material in the pipe. Accordingly, we have found that the effective amount of catalyst in the composition can range from a fraction of 1% up to about 10% by weight thereof.

Other suitable thermosetting resins include polyester resins, and in particular the alkyd resins comprising the reaction product or copolymers of polyhydric alcohols and dibasic acids. Typical of the large number of available polyester resins are the copolymers of phthalic anhydride and a polyhydric alcohol such as ethylene glycol, diethylene glycol or glycerin, maleic anhydride and a polyhydric alcohol, sebacic acid and a polyhydric alcohol, and diethylene glycol and bis-allyl carbonate. These and equivalent polyester resins are advantageously partially polymerized prior to their incorporation in the plastic composition, and may be modified in the manner known in the art by the admixture therewith of such modifiers as epoxidized oils and unsaturated fatty acids. If desired, suitable polyester polymerization catalysts well known to the art may also be included in composition.

Other thermosetting polymers that can be employed in our composition include the acrylic compounds, and the phenol-formaldehyde, furfural-formaldehyde, and resorcinol-formaldehyde resins. Moreover, the thermosetting material need not be in every case what is commonly and rather loosely known as a "resin." For example, substances such as phthalic anhydride and diallyl phthalate may be employed as a thermosetting reactive material in our plastic composition. The essential consideration is that the substance be one that will plasticize the vinyl polymers of the tape 12, and will react and copolymerize or otherwise combine chemically with the thermosetting resin on the glass fiber rovings subsequently applied thereover. Accordingly, as used herein and in the appended claims the term "thermosetting material" not only includes the individual compounds referred to, but also compatible mixtures of two or more of these compounds.

If the amount of thermosetting resin or equivalent reactive material is less than about 25% by weight of the plastic composition, an additional plasticizing substance (or substances) must be incorporated in the composition. However, in no event should the amount of thermosetting resin or reactive material be less than about 10% by weight of the composition, lesser amounts resulting in an imperfect bond between the plastic tape and the glass fiber reinforced plastic pipe body. The plasticizing substances, therefore, may be present in an effective amount up to 45% by weight of the composition, depending on the relative amounts of vinyl polymers and uncured thermosetting materials present therein. Useful plasticizers include dioctyl phthalate, diallyl phthalate, fatty acid esters (e. g. ricinoleates), chlorinated paraffins, unsaturated fatty acids (e. g. linseed oil), and tricresyl phosphate. Of these, we presently prefer to use dioctyl phthalate and diallyl phthalate.

To form the plastic tape 12, the vinyl polymers (ordinarily in the form of dry granules or flakes), the thermosetting resin or equivalent reactive material, any additional plasticizing substances, and any polymerization catalysts employed, are thoroughly mixed together to form a smooth, plastic mass that can be rolled out in the form of a thin film or tape. The mixing is best accomplished by milling the ingredients together in the manner well known in the plastics art. The thickness of the finished film or tape of the plastic composition is advantageously about 0.01 of an inch, but of course its thickness is not critical.

The following examples are representative but not limitative of plastic compositions we have found useful in the practice of our invention. Proportions are given as parts by weight.

*Example I*

200 parts 96% vinyl chloride and 4% vinyl acetate copolymer
120 parts partially polymerized bisphenol-epichlorhydrin of molecular weight of about 830
80 parts bisphenol-epichlorhydrin of molecular weight of about 830 containing 3% of borontrifluoride monoethylamine catalyst

*Example II*

200 parts 96% vinyl chloride and 4% vinyl acetate polymer
20 parts dioctyl phthalate
108 parts bisphenol-epichlorhydrin of molecular weight of about 830
72 parts bisphenol-epichlorhydrin of molecular weight of about 830 catalyzed with 6% borontrifluoride piperidine

*Example III*

200 parts 96% vinyl chloride and 4% vinyl acetate polymer
40 parts tricresyl phosphate
160 parts bisphenol epichlorhydrin of molecular weight of about 830

*Example IV*

400 parts vinylidene chloride polymer
60 parts dioctyl phthalate
140 parts bisphenol-epichlorhydrin of molecular weight of about 830

*Example V*

200 parts vinyl chloride polymer
80 parts dioctyl phthalate
120 parts partially polymerized diethylene glycol-epibromhydrin

*Example VI*

400 parts vinyl butyral polymer
20 parts linseed oil
144 parts partially polymerized bisphenol-epichlorhydrin
36 parts partially polymerized bisphenol-epichlorhydrin plus 3% of borontrifluoride triethanolamine catalyst

*Example VII*

200 parts 96% vinyl chloride and 4% vinyl acetate copolymer
200 parts dioctyl phthalate
50 parts phthalic anhydride

*Example VIII*

300 parts 96% vinyl chloride and 4% vinyl acetate copolymer
200 parts dioctyl phthalate
100 parts diallyl phthalate

*Example IX*

100 parts vinylidene chloride
40 parts dioctyl phthalate
40 parts partially polymerized sebacic acid and diethylene glycol

*Example X*

100 parts vinylidene chloride
30 parts dioctyl phthalate
10 parts linseed oil
40 parts partially polymerized sebacic acid and diethylene glycol

*Example XI*

70 parts of vinyl chloride polymer
10 parts dioctyl phthalate
10 parts of diallyl phthalate
10 parts of partially polymerized bisphenol-epichlorhydrin of molecular weight of about 830
6 parts borontrifluoride triethanolamine

*Example XII*

70 parts of 96% vinyl chloride and 4% vinyl acetate copolymer
20 parts of diallyl phthalate
10 parts of partially polymerized trimethylene glycol-epichlorhydrin
6 parts of borontrifluoride triethanolamine Referring again to Fig. 1 of the drawings, after one or more layers of the plastic tape 12 is applied to the mandrel 11, one or more layers of glass fiber rovings 13 coated and impregnated with a thermosetting resin composition are applied thereto. The number of layers of glass fibers applied to the mandrel is dependent upon the desired thickness and strength of the resulting plastic pipe wall. In practice, more than two layers of plastic-impregnated fibers are usually applied to the mandrel 11. Moreover, although we presently prefer to use multifilament glass fiber rovings as the reinforcing material in our plastic pipe structure, other equivalent reinforcing materials can be employed. Of these equivalent materials, continuous strands of high strength rayon or nylon fibers are particularly useful.

The thermosetting plastic composition with which the glass fiber rovings 13 or equivalent materials are impregnated is advantageously compounded of an uncured epoxide or alkyd polyester resin, although other thermosetting resins such as the acrylic compounds and the formaldehyde resins can be employed. The resin selected, of course, must be one that will copolymerize or otherwise combine readily with the thermosetting resin or equivalent reactive material of the plastic tape 12. For example, an epoxide resin in the uncured liquid resin composition will combine with similar epoxide resins or with such compounds as diallyl phthalate in the tape 12, and an alkyd polyester resin in the liquid composition will combine with similar alkyd resins, with an epoxide resin or with such compounds as phthalic anhydride in the tape 12. The resinous material with which the glass fibers are coated (particularly if it is an epoxide composition) is preferably partially polymerized to stabilize it and to increase its molecular weight and viscosity. When wrapped about the mandrel, the coating of viscous plastic composition on each of the glass fibers 13 runs together with the coating on adjacent fibers, and with the coatings on underlying and overlying layers of fiber, to form a coherent plastic body through which the glass fiber rovings 13 extend. On curing of the liquid plastic composition, the cured resins form a monolithic glass fiber reinforced plastic body chemically bonded through copolymerization or other chemical reaction with the thermosetting material of the underlying layer of plastic tape 12.

To retain the liquid plastic composition in place on the mandrel the outer layer of plastic-coated glass fiber rovings is advantageously surrounded by a layer of non-reactive tape 14. The tape 14 is advantageously of cellophane or "Mylar" (polyethylene terephthalate) film which, after the plastic composition of the pipe is cured, is removed therefrom. In addition supplementary layers of plastic tape can be incorporated in the plastic pipe structure in the manner hereinbefore described. For example, a layer of tape 12 can be applied about the layers of liquid plastic coated fibers 13 so that, when the plastic of the pipe is cured, the outer surface of the pipe will comprise an impervious sheath of plastic chemically bonded to the underlying resinous pipe body. Moreover, a layer of thermoplastic vinyl polymers plasticized with non-thermosetting materials can be disposed under the innermost plastic tape 12 or about the outermost plastic tape 12 (if any) to provide the inner lining and the outer sheath of the finished pipe with surfacing layers of resilient and virtually chemically inert vinyl plastic.

The plastic constituents of the pipe are cured by transferring the mandrel with the plastic materials thereon to a suitable oven where it is heated at a sufficient temperature and for a sufficient length of time to thoroughly cure the plastic materials. During the curing operation the thermosetting materials in the plastic composition and in the reactive tape 12 becomes chemically bonded together, while concurrently the adjoining turns of the reactive tape 12 become fusion-bonded to each other and to the underlying or overlying layers, if any, of non-reactive vinyl tape or tubing. Ordinarily the plastic of the pipe is quite thoroughly cured after heating at a temperature of about 345° F. for a period of about 30 minutes. However, it is particularly advantageous to subject the plastic pipe to a post-cure heat treatment at a temperature of about 350° F. for a period of 3 hours or more in order to insure complete reaction of all thermosetting materials and to develop the maximum physical strength of the finished pipe. The post-cure heat treatment can be carried out either before or, preferably, after removal of the pipe from the mandrel 11.

After the curing operation is completed and the resulting plastic pipe is stripped from the mandrel 11, the layer of parting tape 10 is then pulled easily from within the pipe. As shown in Fig. 2 of the drawing the finished plastic pipe 15 produced by the method of our invention has an integrally formed plastic structure comprising an impervious inner lining 16 chemically bonded to a coherent plastic pipe body through which extend continuous strands of glass fiber reinforcing material 13. In the modification of our invention shown in Fig. 3 (and in Fig. 5), the integrally formed plastic pipe structure 18 includes a supplementary innermost layer 19 of vinyl plastic fusion-bonded to the vinyl-and-thermoset resin layer 16 of the inner lining of the pipe. The vinyl plastic layer of the inner lining is plasticized with a substantially non-thermosetting material such as tricresyl phosphate and hence, after incorporation in the plastic pipe structure, the lining 19 retains the resilience and resistance to fracture characteristic of such vinyl plastic material. As a consequence, the pipe 18 has even greater resistance to fatigue failure under the most severe service conditions than the pipe of our invention lacking this supplementary inner lining. In either case, however, the demonstrated ability of our integrally formed plastic pipe to withstand the frequent pressure surges encountered in service far exceeds that of any comparable prior art pipe.

From the foregoing description of our invention, it will be seen that we have devised an improved method of manufacture of plastic pipe resulting in the formation of pipe having characteristics superior to any heretofore known.

We claim:

1. The method of making plastic pipe which comprises applying a layer of plastic tape about a pipe-forming mandrel, said plastic tape comprising an intimate blend of from about 45% to 75% by weight of at least one polymer selected from the group consisting of polymers of vinyl chloride, vinyl acetate, vinylidene chloride and vinyl butyral and from about 10% to 50% by weight of polymerizable thermosetting materials compatible with said vinyl polymers, applying about the layer of plastic tape a layer of continuous strands of fiber coated and impregnated with an uncured liquid resin composition, said uncured resin composition being reactive with the thermosetting materials of said plastic tape to form copolymers therewith when said resin is cured, and heating the materials on the mandrel to cure the resin composition.

2. In the method of making plastic pipe wherein a layer of plastic tape is applied about a pipe-forming mandrel and at least one layer of continuous strands of plastic impregnated fibers is applied about said layer of plastic tape, the improvement which comprises forming said plastic tape of from about 45% to 75% by weight of at least one vinyl polymer selected from the group consisting of vinyl chloride, vinyl acetate, vinylidene chloride and vinyl butyral plasticized with from about 10% to 50% by weight of polymerizable thermosetting materials, coating and impregnating said strands of continuous fibers with an uncured thermosetting liquid resin composition that is reactive with the plasticizer of said plastic tape to form a copolymer therewith when said resin is heated to its curing temperature, and heating the materials on the mandrel to cure the thermosetting resin composition and thereby form a chemical bond between the thermosetting constituent of the plastic tape and the thermosetting resin on said fibers.

3. The method of making plastic pipe which comprises applying at least one layer of plastic tape about a pipe-forming mandrel, said plastic tape comprising an intimate blend of from about 45% to 75% by weight of at least one polymer selected from the group consisting of polymers of vinyl chloride, vinyl acetate, vinylidene chloride and vinyl butyral, from about 10% to 50% by weight of polymerizable thermosetting materials compatible with said vinyl polymers and up to 45% by weight of a plasticizer for said vinyl polymers, applying about the layer of the plastic tape at least one layer of continuous strands of fiber coated and impregnated with an uncured resin composition, said uncured resin being reactive with the thermosetting materials of said plastic tape to form a copolymer therewtih when said resin is cured, and heating the materials on the mandrel to cure the resin composition.

4. The method of making plastic pipe which comprises applying a parting layer of non-adherent tape about a pipe-forming mandrel, applying at least one layer of plastic tape about the layer of non-adherent parting tape, said plastic tape comprising an intimate blend of from about 45% to 75% by weight of at least one polymer selected from the group consisting of polymers of vinyl chloride, vinyl acetate, vinylidene chloride and vinyl butyral, up to 45% by weight of a plasticizer for said vinyl polymers, from 10% to 50% by weight of a partially polymerized thermosetting material, and up to 10% by weight of a polymerization catalyst for said thermosetting material, applying about the layer of plastic tape at least one layer of glass fiber rovings coated and impregnated with an uncured liquid resin composition, said uncured resin being reactive with the thermosetting material of said plastic tape to form a copolymer therewith when said resin is cured, and heating the materials on the mandrel to cure the resin composition.

5. The method of making plastic pipe which comprises applying a layer of plastic tape about a pipe-forming mandrel, said plastic tape comprising from about 45% to 75% by weight of at least one polymer selected from the group consisting of polymers of vinyl chloride, vinyl acetate, vinylidene chloride and vinyl butyral plasticized with from about 10% to 50% by weight of a partially polymerized thermosetting resin selected from the group consisting of epoxide and alkyd polyester resins, applying about the layer of plastic tape a plurality of layers of continuous strands of fiber coated and impregnated with an uncured liquid plastic composition of the same thermosetting resin as is incorporated in the plastic tape, and heating the plastic materials on the mandrel to cure the thermosetting resins.

6. The method of making plastic pipe which comprises applying a layer of plastic tape about a pipe-forming mandrel, said plastic tape comprising an intimate mixture of from about 45% to 75% by weight of at least one vinyl polymer selected from the group consisting of vinyl chloride, vinyl acetate, vinylidene chloride and vinyl butyral, said vinyl polymers being plasticized with from 10% to 50% by weight of thermosetting materials, applying about the plastic tape a plurality of layers of fiber reinforcing material coated and impregnated with an uncured liquid plastic composition of a thermosetting resin selected from the group consisting of epoxide and alkyd polyester resins, the thermosetting resin of said composition being reactive with the plasticizer of said plastic tape to form a copolymer therewith when said resin is heated to its curing temperature, and heating the plastic materials on the mandrel to completely cure the thermosetting resins.

7. The method of making plastic pipe which comprises applying a parting layer of non-adherent tape about a pipe-forming mandrel, applying a layer of plastic tape to the parting tape, said plastic tape comprising an intimate mixture of from about 45% to 75% by weight of at least one polymer selected from the group consisting of polymers of vinyl chloride, vinyl acetate, vinylidene chloride and vinyl butyral, from about 10% to 50% by weight of a partially polymerized thermosetting epoxide resin, and up to 45% by weight of a plasticizer other than said epoxide resin for said vinyl polymers, applying about the plastic tape a plurality of layers of glass fiber rovings coated and impregnated with an uncured liquid epoxide resin composition, heating the plastic materials on the mandrel to cure the epoxide resins, removing the resulting plastic pipe from the pipe-forming mandrel, and removing from within the plastic pipe the parting layer of non-adherent tape.

8. The method of making plastic pipe which comprises applying about a pipe-forming mandrel a layer of a first plastic tape comprising at least one polymer selected from the group consisting of polymers of vinyl chloride, vinyl acetate, vinylidene chloride and vinyl butyral plasticized with a non-thermosetting material, applying about said first plastic tape a layer of a second plastic tape comprising an intimate mixture of from about 45% to 75% by weight of at least one of the aforesaid vinyl polymers and from about 10% to 50% by weight of polymerizable thermosetting materials compatible with said vinyl polymers, applying about the second plastic tape a plurality of layers of continuous strands of fiber rovings coated and impregnated with an uncured thermosetting resin composition capable of forming copolymers with the thermosetting materials of said second plastic tape, and heating the plastic materials on the mandrel to cure the thermosetting resins and to fusion-bond the two layers of plastic tape together.

9. The method of making plastic pipe which comprises applying about a pipe-forming mandrel an inner layer of plastic tape comprising an intimate mixture of from about 45% to 75% by weight of at least one polymer selected from the group consisting of polymers of vinyl chloride, vinyl acetate, vinylidene chloride and vinyl butyral and from 10 to 50% by weight of polymerizable thermosetting materials compatible with said vinyl polymers, applying about the plastic tape at least one layer of fiber reinforcing material coated and impregnated with an uncured thermosetting liquid plastic composition, said liquid plastic composition being reactive with the thermosetting materials of said plastic tape to form copolymers therewith when heated to its curing temperature, applying about said layers of liquid plastic coated reinforcing material an outer layer of a second plastic tape comprising an intimate mixture of from about 45 to 75% by weight of at least one of the aforesaid vinyl polymers and from about 10% to 50% by weight of thermosetting materials, the thermosetting materials of said second plastic tape being reactive with the liquid plastic composition on the reinforcing material to form copolymers therewith when heated to its curing temperature, and heating the materials on the mandrel to cure the thermosetting plastic compositions.

10. The method of making plastic pipe which comprises applying about a pipe-forming mandrel a layer of a first plastic tape comprising at least one polymer selected from the group consisting of polymers of vinyl chloride, vinyl acetate, vinylidine chloride and vinyl butyral plasticized with a non-thermosetting material, applying about said first plastic tape a layer of a second plastic tape comprising an intimate mixture of from 45% to 75% of at least one of the aforesaid vinyl polymers and from about 10% to 50% by weight of thermosetting materials compatibile with said vinyl polymers, applying about the second plastic tape a plurality of layers of continuous strands of fiber coated and impregnated with an uncured thermosetting liquid plastic composition capable for forming copolymers with the thermosetting materials of said second plastic tape, applying about said layers of liquid plastic coated fibers a layer of a plastic tape having substantially the same composition as that of the second plastic tape, and heating the plastic materials on the mandrel to cure the thermosetting constituents thereof and to fusion-bond the layer of the first plastic tape to the layer of the second plastic tape.

11. The method of making plastic pipe which comprises applying about a pipe-forming mandrel a layer of plastic tape comprising from about 45% to 75% of at least one polymer selected from the group consisting of polymers of vinyl chloride, vinyl acetate, vinylidene chloride and vinyl butyral and from about 10% to 50% by weight of polymerizable thermosetting materials compatible with said vinyl polymers, applying about said plastic tape a plurality of layers of continuous strands of fiber rovings coated and impregnated with an uncured thermosetting liquid plastic composition, said liquid plastic composition being reactive with the thermosetting materials of said plastic tape to copolymerize therewith when heated to its curing temperature, applying about said layers of plastic coated fiber rovings a layer of a second plastic tape comprising an intimate mixture of from about 45% to 75% by weight of at least one of the aforesaid vinyl polymers and from about 10% to 50% by weight of thermosetting materials compatible with said vinyl polymers, the thermosetting materials of said second plastic tape being reactive with the liquid plastic composition on said fiber rovings to copolymerize therewith when heated to its curing temperature, applying about said second plastic tape a layer of a third plastic tape comprising at least one of the aforesaid vinyl polymers plasticized with a non-thermosetting material, and heating the plastic materials on the mandrel to cure the thermosetting constituents thereof and to fusion-bond the third plastic tape to the second plastic tape.

12. The method of making plastic pipe which comprises applying about a pipe-forming mandrel a layer of a first plastic tape comprising at least one polymer selected from the group consisting of polymers of vinyl chloride, vinyl acetate, vinylidene chloride and vinyl butyral plasticized with a non-thermosetting material, applying about said first plastic tape a layer of a second plastic tape comprising an intimate mixture of from about 45% to 75% by weight of at least one of the aforesaid vinyl polymers and from about 10% to 50% by weight of thermosetting materials compatible with said vinyl polymers, applying about the second plastic tape a plurality of layers of continuous strands of fiber rovings coated and impregnated with an uncured thermosetting liquid plastic composition, said liquid plastic composition being reactive with the thermosetting materials of said second plastic tape when heated to the curing temperature of the thermosetting materials, applying about the layers of plastic coated fiber rovings a layer of a third plastic tape comprising an intimate mixture of from about 45% to 75% by weight of at least one of the aforesaid vinyl polymers and from about 10% to 50% by weight of thermosetting materials compatible with said vinyl polymers, the thermosetting materials of said third plastic tape being reactive with the liquid plastic composition on said fiber rovings to copolymerize therewith when heated to the curing temperature of the thermosetting materials, applying about said third plastic tape a layer of a fourth plastic tape comprising at least one of the aforesaid vinyl polymers plasticized with a non-thermosetting material, and heating the plastic materials on the mandrel to cure the thermosetting constituents thereof and to fusion-bond the first plastic tape to the second plastic tape and the fourth plastic tape to the third plastic tape.

13. An integrally formed plastic pipe comprising an impervious plastic inner lining chemically bonded to a fiber reinforced plastic pipe body, said inner lining comprising from about 45% to 75% by weight of at least one vinyl polymer selected from the group consisting of vinyl chloride, vinyl acetate, vinylidene chloride and vinyl butyral and from about 10% to 50% by weight of a thermosetting resinous material, said fiber reinforced plastic pipe body comprising continuous strands of fiber reinforcing material extending through a coherent body of cured thermosetting resin copolymerized with the thermosetting material of said inner lining.

14. An integrally formed plastic pipe comprising an impervious plastic inner lining chemically bonded to a fiber reinforced plastic pipe body, said inner lining comprising from about 45% to 75% by weight of at least one vinyl polymer selected from the group consisting of vinyl chloride, vinyl acetate, vinylidene chloride and vinyl butyral and from 10% to 50% by weight of thermosetting materials, said fiber reinforced plastic pipe body comprising continuous strands of fiber reinforcing material extending through a coherent body of a thermosetting resin copolymerized with the thermosetting material of the inner lining, the thermosetting resin of said plastic pipe body being selected from the group consisting of epoxide and alkyd polyester resins.

15. An integrally formed plastic pipe comprising an impervious plastic inner lining chemically bonded to a fiber reinforced plastic pipe body, said plastic inner lining comprising an innermost layer of at least one polymer selected from the group consisting of polymers of vinyl chloride, vinyl acetate, vinylidene chloride and vinyl butyral plasticized with non-thermosetting materials and fusion-bonded to an intermediate layer of from about 45% to 75% by weight of at least one of the aforesaid vinyl polymers and from about 10% to 50% by weight of thermosetting materials, said fiber reinforced plastic pipe body comprising continuous strands of fiber reinforcing material extending through a coherent body of thermosetting resin copolymerized with the thermosetting materials of the intermediate layer of the inner lining.

16. An integrally formed plastic pipe comprising a fiber reinforced plastic pipe body having an impervious plastic inner lining and an impervious plastic outer sheath chemically bonded thereto, said plastic inner lining and said plastic outer sheath each comprising from about 45% to 75% by weight of at least one vinyl polymer selected from the group consisting of vinyl chloride, vinyl acetate, vinylidene chloride and vinyl butyral and from about 10% to 50% by weight of thermosetting materials, said fiber reinforced plastic pipe body comprising continuous strands of reinforcing material extending through a coherent body of thermosetting resin copolymerized with the thermosetting materials of the inner lining and the outer sheath.

17. An integrally formed plastic pipe comprising a fiber reinforced plastic pipe body having an impervious plastic inner lining and an impervious plastic outer sheath chemically bonded thereto, said plastic inner lining comprising an innermost layer of at least one polymer selected from the group consisting of polymers of vinyl chloride, vinyl acetate, vinylidene chloride and vinyl butyral plasticized with a non-thermosetting material and an intermediate layer of from about 45% to 75% by weight of at least one of the aforesaid vinyl polymers and from about 10% to 50% by weight of thermosetting materials, the two layers of said inner lining being fusion-bonded together, said plastic outer sheath comprising from about 45% to 75% by weight of at least one of the aforesaid vinyl polymers and from about 10% to 50% by weight of thermosetting materials, said fiber reinforced plastic pipe body comprising continuous strands of reinforcing material extending through a coherent body of thermosetting resin copolymerized with the thermosetting materials of said inner lining and said outer sheath.

18. An integrally formed plastic pipe comprising an impervious plastic inner lining and an impervious plastic outer sheath each chemically bonded to a fiber reinforced plastic pipe body, said plastic inner lining comprising from about 45% to 75% by weight of at least one polymer selected from the group consisting of polymers of vinyl chloride, vinyl acetate, vinylidene chloride and vinyl butyral and from about 10% to 50% by weight of thermosetting materials, said plastic outer sheath comprising an outermost layer of at least one of the aforesaid vinyl polymers plasticized with non-thermosetting materials and fusion-bonded to an intermediate layer of from about 45% to 75% by weight of at least one of the aforesaid vinyl polymers and from about 10% to 50% by weight of thermosetting materials, said fiber reinforced plastic pipe body comprising continuous strands of fiber extending through a coherent body of thermosetting resin, said thermosetting resin being copolymerized with the thermosetting materials of said inner lining and said outer sheath.

19. An integrally formed plastic pipe comprising a fiber reinforced plastic pipe body having an impervious plastic inner lining and an impervious plastic outer sheath chemically bonded thereto, said plastic inner lining and said plastic outer sheath each comprising a surfacing layer of at least one vinyl polymer selected from the group consisting of vinyl chloride, vinyl acetate, vinylidene chloride and vinyl butyral plasticized with a non-thermosetting material and an intermediate layer of from about 45% to 75% by weight of at least one of the aforesaid vinyl polymers and from about 10% to 50% by weight of thermosetting materials, said surfacing layer and said intermediate layer being fusion-bonded together, said fiber reinforced plastic pipe body comprising continuous strands of fiber extending through a coherent body of thermosetting resin, said resin being copolymerized with the thermosetting materials of the intermediate layers of said inner lining and said outer sheath.

20. An integrally formed plastic pipe comprising an impervious plastic inner lining chemically bonded to a glass fiber reinforced plastic pipe body, said inner lining comprising from 45% to 75% by weight of at least one vinyl polymer selected from the group consisting of vinyl chloride, vinyl acetate, vinylidene chloride and vinyl butyral, from 10% to 50% by weight of a thermosetting epoxide resin, and up to 45% by weight of a plasticizer for said vinyl polymers other than said epoxide resin, said glass fiber reinforced plastic pipe body comprising continuous strands of glass fiber reinforcing material extending through a coherent body of cured epoxide resin copolymerized with the epoxide resin of the inner lining.

21. The method of making plastic pipe which comprises forming an intimate calenderable mixture of at least one thermoplastic polymer selected from the group consisting of polymers of vinyl chloride, vinyl acetate, vinylidene chloride and vinyl butyral, a partially polymerized thermosetting resin compatible with said thermoplastic polymers, a plasticizer for said thermoplastic polymers, and a polymerization catalyst for said thermosetting resin the catalytic action of which is actuated by heating said catalyst to a temperature in excess of 100° F., calendering said mixture at a temperature below that at which the polymerization catalyst becomes active to form a flexible film therefrom, applying a continuous layer of the calendered film of the mixture about a pipe-forming mandrel, applying about said layer of film a layer of fiber reinforcing material coated and impregnated with an uncured thermosetting liquid resin composition, the thermosetting resin of said composition being reactive with the thermosetting resin constituent of said layer of film to form a chemical bond therewith when said resin is heated to its curing temperature, and heating the materials of the mandrel to cure the thermosetting resins thereon.

22. The method of making plastic pipe which comprises forming an intimate calenderable mixture of from about 45% to 75% by weight of at least one thermoplastic polymer selected from the group consisting of polymers of vinyl chloride, vinyl acetate, vinylidene chloride and vinyl butyral, from about 10 to 50% by weight of at least one partially polymerized thermosetting resin selected from the group consisting of epoxide resins and acrylonitrile-butadiene resins, up to 45% by weight of a plasticizer for said thermoplastic polymers, and from about 1 to 10% by weight of a polymerization catalyst for said thermosetting resins the catalytic action of which is actuated by heating said catalyst to a temperature in excess of 100° F., calendering said mixture at a temperature below that at which the polymerization catalyst becomes active to form a flexible film therefrom, applying a continuous layer of the calendered film of the mixture about a pipe-forming mandrel, applying about said layer of film a layer of fiber reinforcing material coated and impregnated with an uncured thermosetting liquid resin composition, the thermosetting resin of said composition being reactive with the thermosetting resin constituent of said layer of film to form a chemical bond therewith when said resin is heated to its curing temperature, and heating the materials of the mandrel to cure the thermosetting resins thereon.

23. The method of making plastic pipe which comprises forming an intimate calenderable mixture of from about 45% to 75% by weight of at least one thermoplastic polymer selected from the group consisting of polymers of vinyl chloride, vinyl acetate, vinylidene chloride and vinyl butyral, from about 10 to 50% by weight of at least one partially polymerized thermosetting resin selected from the group consisting of epoxide resins and acrylonitrile rubbers up to 45% by weight of a plasticizer for said thermoplastic polymers, and up to 10% by weight of a polymerization catalyst for said thermosetting resins selected from the group consisting of borontrifluoride monoethylamine, borontrifluoride triethanolamine and borontrifluoride piperidene, calendering said mixture at a temperature of at least 250° F. but below that at which the polymerization catalyst becomes active to form a flexible film from said mixture, applying a continuous layer of the calendered film of the mixture about a pipe-forming mandrel, applying about said layer of film a layer of fiber reinforcing material coated and impregnated with an uncured thermosetting liquid resin composition, the thermosetting resin of said composition being reactive with the thermosetting resin constituent of said layer of film to form a chemical bond therewith when said resin is heated to its curing temperature, and heating the materials of the mandrel to a temperature in excess of 300° F. to cure the thermosetting resins thereon.

24. The method of making plastic pipe which comprises forming an intimate calenderable mixture of at least one thermoplastic polymer, at least one partially polymerized thermosetting resin compatible with said thermoplastic polymer, a plasticizer for said thermoplastic polymers, and a polymerization catalyst for said thermosetting resin the catalytic action of which is actuated by heating said catalyst to a temperature in excess of 300° F., calendering said mixture at a temperature below that at which the polymerization catalyst becomes active to form a flexible film therefrom, applying a continuous layer of the calendered film of the mixture about a pipe-forming mandrel, applying about said layer of film a layer of fiber reinforcing material coated and impregnated with an uncured thermosetting liquid resin composition, the thermosetting resin of said composition being reactive with the thermosetting resin constituent of said layer of film to form a chemical bond therewith when said resin is heated to its curing temperature, and heating the materials of the mandrel to cure the thermosetting resins thereon.

References Cited in the file of this patent

UNITED STATES PATENTS

| | | |
|---|---|---|
| 2,454,625 | Bondon | Nov. 23, 1948 |
| 2,512,996 | Bixler | June 27, 1950 |
| 2,525,070 | Greenwald et al. | Oct. 10, 1950 |
| 2,564,194 | De Nie et al. | Aug. 14, 1951 |
| 2,604,464 | Segal et al. | July 22, 1952 |
| 2,614,058 | Francis | Oct. 14, 1952 |
| 2,643,700 | Havens | June 20, 1953 |
| 2,691,694 | Young | Oct. 12, 1954 |
| 2,717,216 | Arone | Sept. 6, 1955 |